E. V. FRENCH & G. F. HILLER.
PROPORTIONAL METER.
APPLICATION FILED JUNE 10, 1905.

923,258.

Patented June 1, 1909.
4 SHEETS—SHEET 1.

Fig. 1.

Witnesses:
Thomas J. Drummond
J. Wm. Lutton

Inventors
Edward V. French
George F. Hiller,
by Crosby Gregory
Attys.

UNITED STATES PATENT OFFICE.

EDWARD V. FRENCH, OF LYNN, AND GEORGE F. HILLER, OF BOSTON, MASSACHUSETTS, ASSIGNORS TO CHARLES H. PHINNEY, TRUSTEE, OF CHESTNUT HILL, MASSACHUSETTS.

PROPORTIONAL METER.

No. 923,258.          Specification of Letters Patent.          Patented June 1, 1909.

Application filed June 10, 1905. Serial No. 264,661.

*To all whom it may concern:*

Be it known that we, EDWARD V. FRENCH and GEORGE F. HILLER, citizens of the United States, and residents, respectively, of Lynn, in the county of Essex and State of Massachusetts, and Boston, in the county of Suffolk and State of Massachusetts, have invented an Improvement in Proportional Meters, of which the following description, in connection with the accompanying drawings, is a specification, like letters on the drawings representing like parts.

This invention relates to that class of fluid meters known as proportional meters, the object of such a device being to measure and record both small and large flows within a reasonable degree of accuracy, and without interposing in the pipe line any obstructive mechanism, and without causing any excessive loss due to friction such as in either case would weaken a water service for fire fighting purposes.

In a fire service it is essential that when the full flow is turned on in case of fire the pressure shall be the maximum obtainable, and hence it is not only desirable but essential that loss by friction in passing through the pipe shall be eliminated so far as possible, and that hence no device shall be placed in the pipe which will interfere with the flow of water, or will be of such nature as is liable to become clogged so as to interfere with the flow.

In these proportional meters a small portion of the flow in the main pipe is shunted off through a by-pass, and the indicating meter is located in the by-pass. By measuring the amount of water passing through the by-pass and by ascertaining the proportion which exists between the amount of water passing through the by-pass and the amount passing through the main, the entire flow of the main is known. This method eliminates all obstruction to the flow of water through the main, due to measuring devices.

This invention is more particularly concerned with securing a construction of a proportional meter which shall measure accurately not only a normal small flow through the by-pass, but also all possible flows through the main pipe. In the first case the indicating meter measures the actual amount passing, and in the second case it measures the total amount of water passing through the proportional meter, that portion passing through the by-pass being measured directly, and that through the main pipe proportionally. The invention secures a reasonably accurate measurement of the water, not only for the usual steady flows of whatever amount through the main pipe, but also for those flows continually varying in amount, such as the flow taking place during the opening or closing of the check-valve in the main pipe.

While it has been found reasonably practicable in this class of proportional meter to measure the flows through the main pipe upon and after the opening of the check-valve, it has also been found that conditions occur upon the reduction of the flow and the closing of the check-valve which render the measurements inaccurate and difficult to obtain. The present invention in particular overcomes these difficulties and secures a reasonably accurate measurement at all times.

The invention also in another aspect is concerned with means for indicating leakage at the main or secondary check-valve. It is often important to know whether or not a check-valve has closed tightly upon its seat, shutting off entirely the flow past the same. This feature of the invention is independent of the number of the check-valves. If, for example, a check-valve is employed by itself in a main or pipe, it is frequently desirable to obtain such an indication. For example, if the main pipe connects with a permanent supply system on the induction side of a check-valve, and with a temporary supply, such as obtained from a pumping system, on the exit side of the check-valve, and the check-valve should not close tightly at the proper time, the result might be that the supply from the temporary system would be forced back into the regular system, past the check-valve. In the present invention if the check-valve fails to close tightly upon its seat an indication is made of that fact.

Another feature of the invention consists of the means for regulating the relative friction loss between the main pipe and the by-pass when the check-valve is open.

These, in general, are the main features of the invention. They will be pointed out more fully in the appended description and specified more in detail in the claims.

The drawings represent the proportional meter of this invention, and the check-valve construction with its indicating mechanism in the preferred form, but it is obvious that the invention is not limited to the construction shown therein, and that many changes in arrangement and construction and manner of operation may be made without departing from the characteristic features of the invention.

The device shown is, for convenience of construction, made up of a number of separate castings bolted together in the usual manner. The general construction and arrangement of these castings is apparent from the drawing and needs no further description.

The device at its lower portion contains a section of the water main, and is adapted to be bolted into the main at A and B, as a section thereof. The passage of the main flow when the check-valve is open is indicated by the arrows 1, 2, 3 and 4.

The main pipe of the device is enlarged to form a cylindrical chamber $a$, and a cylindrical strainer $b$ is placed therein. This pipe section is provided at the rear with a hand-hole plate, the flange $a'$ of which only appears in the drawings, through which the strainer $b$ can be removed and replaced. This strainer leaves the water main entirely unobstructed, being open at both ends, but it protects the indicating meter or measuring mechanism from any foreign matter which might injure or prevent the operation thereof. It is also flushed out by the flow of the water therethrough when the check-valve is open.

The by-pass channel as herein illustrated passes from the chamber $a$ through the check-valves of the ordinary pump form $C^x$, into the meter chamber C, through the valve D, into the chamber E, which forms the eduction chamber of the entire device.

The indicating meter $C^{50}$ is shown as comprising two dials $C'$, $C^2$, and its mechanism may be of any well-known type provided that it is adapted to measure accurately and with slight friction loss small flows of water up to a predetermined amount.

In a water meter of the general type illustrated experience has shown that such an indicating meter measuring flows of water up to 150 gallons per minute accurately and with a slight friction loss is readily obtainable. Since such a meter forms no part of this invention it is not described in detail or illustrated other than in a diagrammatical way. The water after passing into the chamber C operates the mechanism of the indicating meter in usual way, whereby the dial-operating shaft $c^5$ is revolved to cause the dial $C'$ to register. The water then passes on through the horizontal portion of the chamber C and through the valve D hereinafter to be described more in detail, into the chamber E, and out through the main, as indicated by the arrow 4.

The main check-valve F is located in the main pipe in the construction shown at the main entrance to the chamber E. The amount of the flow through the proportional meter upon which the main check-valve F is to open is determined by the friction loss allowable in the indicating meter, or by the amount of the average small flows, and as before stated, 150 gallons per minute has been taken as a fair amount for this purpose. The main check-valve F is arranged not to open until the desired flow has been reached.

With the main check-valve F closed and small flows only being drawn, the water enters the proportional meter as indicated at the arrow 1, passes, as already described, around through the by-pass in which the indicating meter is located and by which it is measured, and then out around the main check-valve and through the main. In this way all small flows are measured accurately. When the flow has reached the predetermined amount, for example 150 gallons per minute, in the by-pass, the main check-valve F then opens, and the flow is directed through the main pipe, as indicated by arrows 1, 2, 3 and 4.

The main check-valve F is here shown as a clapper valve, connected by a universal joint $f^3$, to an arm pivoted at $f$. By means of the universal joint it can be adjusted in a position parallel with its seat, the joint being left slightly free so that the valve will be in a measure self adjusting to fit evenly upon its seat. The clapper valve is provided with a resilient face $f^4$, preferably of rubber. It should also present a substantially continuous, smooth, metallic periphery for a purpose to be described, and this is secured in the construction illustrated by securing a band of metal $f^5$ around the periphery of the clapper, overlapping the resilient face $f^4$. A second arm $f^6$, arranged angularly with respect to the clapper supporting arm, is also at $f$. This arm carries the conoidal valve or horn $g$, and also a weight $f^2$. The arm $f^6$ may be made integral with the valve clapper supporting arm but in the present case it is shown as separate therefrom, carried by the same pivot $f$, and adjustably connected with the clapper valve supporting arm, by means of a curved slot $f^7$, and locking screw $f^8$. The upper limit of movement of the clapper valve F is determined by a stop, herein shown as an adjustable screw $h$ mounted in the casing, contacting with the rim of the valve F. One of these screws may be provided on each side of the periphery of the rim.

The valve seat for the main clapper valve F is of the differential type, secured by providing in the valve seat $k$ an annular chamber $k'$, opening continuously or at intervals at the face of the seat, and connected at some point with the atmosphere. By proportioning the width of the valve seat the effective area of pressure upon opposite sides of the clapper valve F may be regulated. Such a valve seat is known as a differential seat.

As the flow through the by-pass increases until the predetermined maximum flow through the by-pass is reached, the pressure on the eduction side of the main check valve F decreases until the effective pressure of that side of the valve almost equals the effective pressure on the opposite side. Thereupon any slight increase in the flow through the by-pass will cause the check-valve immediately to leave its seat. Thereupon the flow takes place through the main pipe, as well as the by-pass, and the device operates on the proportional principle of measurement. When the flow through the main has decreased to the minimum amount, or the maximum amount which should pass through the by-pass, the main check-valve F should close in order to secure accurate measurement. In closing, however, the main check valve being off its seat, is exposed on both of its faces to the pressure of the water substantially equally, so that the forces tending to close the main check-valve onto its seat consist of the weight of the moving parts and the piston-like action of the conoidal valve due to the difference of pressure thereon. For this reason the weight $f^2$ is employed to increase the force acting to close the valve.

In a proportional meter where the indicating meter is located in the by-pass the flow of water through the by-pass in which the indicating meter is located will, upon the opening of the main check-valve F, drop at once from the maximum flow through the by-pass, down to a small fraction of the flow through the main pipe, or in other words, to a small fraction of the maximum flow through the by-pass, because the maximum flow through the by-pass, and the flow through the main pipe are presumed to be equal upon the opening of the main check-valve F. Experience has also shown that while the main check-valve F is opening from the position in which the minimum flow begins to its wide open position, and the main flow is consequently increasing from its minimum amount to its maximum, or while any variation is taking place in the main flow, the flow through the by-pass is not strictly proportional to the varying main flow. Hence, it is necessary to vary the size of the exit opening of the by-pass as the main check-valve opens and closes, so as to maintain a constant proportion between the flow through the by-pass, and through the main pipe. To secure this result the conoidal valve $g$, operating in connection with the exit port D, is provided. In the form illustrated the port D is formed with a substantially sharp edge. The horn-shaped valve which as fairly descriptive has been termed a conoidal valve, may be of any desired cross-section, but it must vary in cross-sectional area from end to end in a manner determined by experiment, so that as it moves through the port D the exit opening varies in such a manner as to secure a constant proportion between the flow therethrough and the flow through the more or less open main. It is difficult to describe the exact shape which this valve $g$ must take, and it can only be determined from experimenting with the conditions which prevail in the given device.

In the position illustrated in the drawing the main check-valve F is closed and the conoidal valve is arranged at such a distance from the port D as to allow the maximum flow through the by-pass to pass unimpeded through the port D. When the main check-valve F opens the conoidal valve G must move up through the port D to bring its large cross-section, as at $g'$, into the port, thus restricting the amount passing through the by-pass to maintain the constant proportion between the flow through the by-pass and the main. When the main check-valve F is wide open, as determined by the stop $h$, the smallest cross-sectional area of the conoidal valve $g$ will be within the port D, and the flow will thus be increased to an amount necessary to maintain the same proportion, while at intermediate portions the curved shape of the valve will at all times present a cross-section in the port D which will maintain this same proportion.

A lever $d$ is pivoted at $d'$ to the casing, and this lever operates at one end in connection with an arm $g^{2x}$ connected with the conoidal valve $g$, and at the other end with a rod $m^2$, which rod is connected with and operates a suitable clutch to clutch and unclutch the driving mechanism of the indicating meter with the dial $C^2$. When, therefore, the main check-valve F is open the dial $C^2$ is immediately set in operation by the indicating meter driving mechanism, and when the main check valve F is closed the same mechanism operates to unclutch the dial $C^2$ from the indicating meter driving mechanism.

Figure 5:
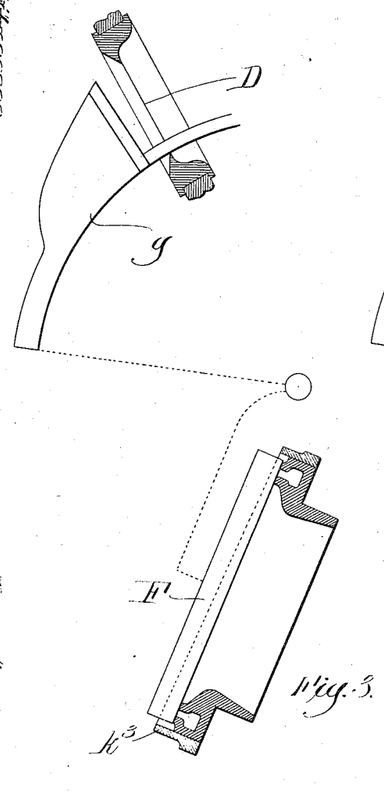
Figure 7:
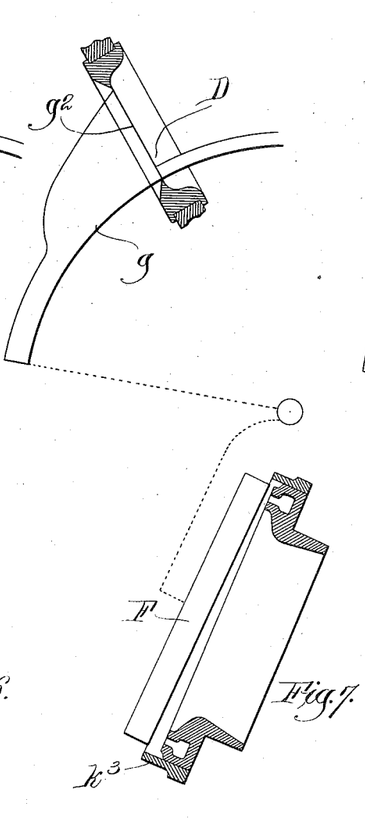
Figure 8:
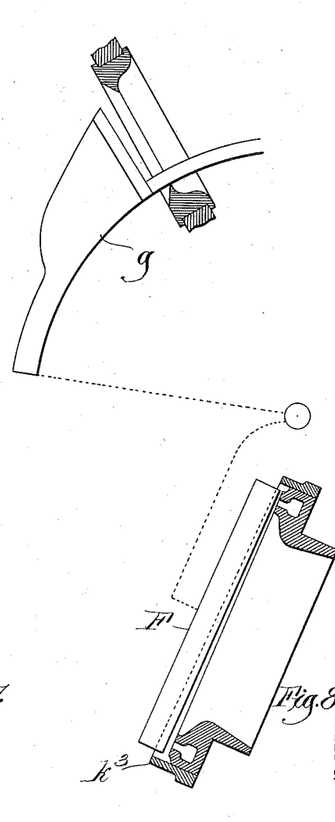

With the construction thus far described by proportioning properly the effective pressure areas of the main check-valve and the timing of the conoidal valve with its port, when the main check-valve begins to open and the flow through the by-pass drops to its minimum amount, that limit will be one that will be within the range of the indicating meter. When, however, the flow becomes reduced, it is found that the check-valve will not return to its seat at a quantity substantially the same as that which caused the opening of the check-valve, owing to the fact that the pressure on the unseated check-valve is in equilibrium, and the only force acting to close the valve is that due to the weight of the parts. The flow in fact continues to decrease until, when the check-valve does close upon its seat the proportional flow through the by-pass is so small as to be ineffective to operate the indicating meter employed. It becomes necessary, therefore, to provide for the closing of the main check-valve at such a flow as will secure a proportional flow through the by-pass capable of operating the indicating meter satisfactorily. This result is secured by prolonging the conoidal valve $g$ to the point $g^2$ at its maximum cross-sectional area, and also in providing upon the valve-seat $k$ an annular lip $k^3$, closely adjacent the periphery $f^5$ of the clapper valve. This lip is so constructed that the valve clapper works as a sort of loose piston therein. When, now, the flow through the main becomes sufficient to open the main check-valve, owing to the fact that the lip $k^3$ closely encircles the valve, the flow is prevented from escaping to any substantial amount until the clapper valve F has been forced beyond the lip $k^3$ sufficiently to allow of the passage of the flow. (Fig. 5.) This extended movement at the same time forces the prolonged portion of the valve $g$ through the port D, thus insuring the desired size of exit opening at the port D. When, now, the flow decreases through the main the clapper valve F will readily approach the edge of the lip $k^3$, and the prolongation of the horn $g$ will move through the port D until the parts are in substantial equilibrium with a small flow passing through the main check-valve where the clapper has closely approached the lip $k^3$. (Fig. 7.) A further slight decrease in the flow will destroy this equilibrium, and allow the weight of the parts to act to move the main clapper inside of the lip $k^3$. (Fig. 8.) But this movement of the parts withdraws the conoidal valve $g$ entirely from the port D; thus while the open area of the main check-valve, which is the area between the periphery $f^5$ of the clapper F and the lip $k^3$, has remained practically unchanged, the open area of the port D, which is the area between the edge of that port and the end of the conoidal valve $g$, has increased many-fold. The flow, therefore, through the by-pass has become so much greater in proportion that the suddenly reduced flow through the main check-valve allows the main check-valve to close upon its seat. This construction insures the closing of the main check-valve at a time when such a flow is passing through the by-pass which, although less than the flow passing at the time the check-valve opens, is yet sufficient to be readily indicated by the indicating meter, and thus preserve the proportional measurement.

Whenever the check-valve is closed tightly upon its seat the chamber $k'$ is closed and consequently no water can pass out through the connection between the chamber $k'$ and the atmosphere. When, however, the check-valve is not tightly closed, as would be caused by an improper fitting of the valve seat or by obstruction of the valve in some way, then the chamber $k'$ remains open and the water from the main passes into the chamber $k'$ and out through the connection K, to the atmosphere, thus indicating the fact that the check-valve is either leaking or off its seat. The water thus running out through the pipe K may be allowed to waste, or if desired, any common form of indicating, recording and measuring device may be attached to the pipe K, which would serve to indicate when water is running out through said pipe K.

Figure 1:
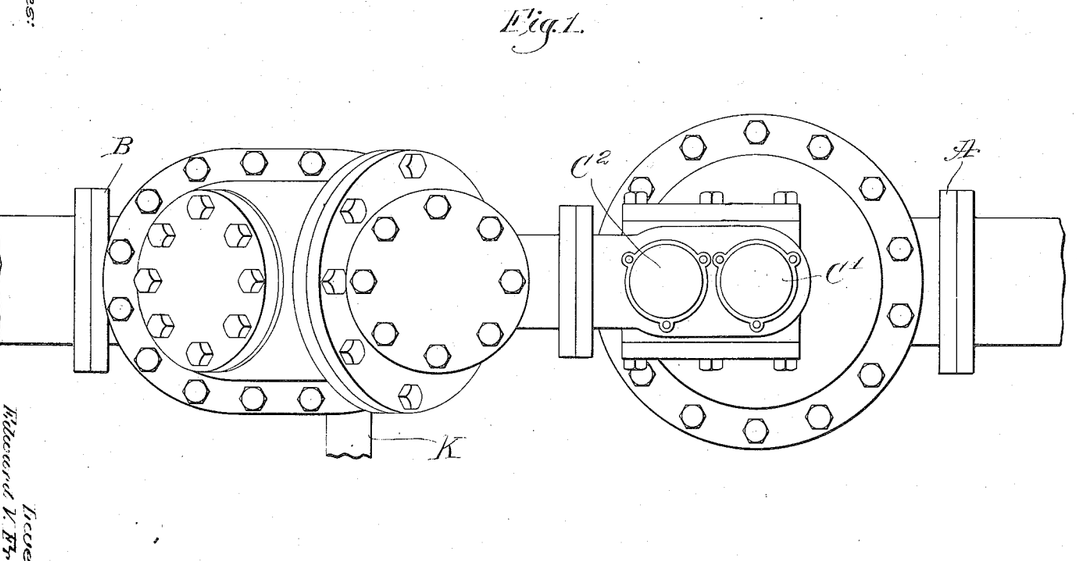
Figure 1 represents a top plan view of the preferred form of the invention comprising all the parts that are necessary to be located in the main as a section thereof.
Figure 2:
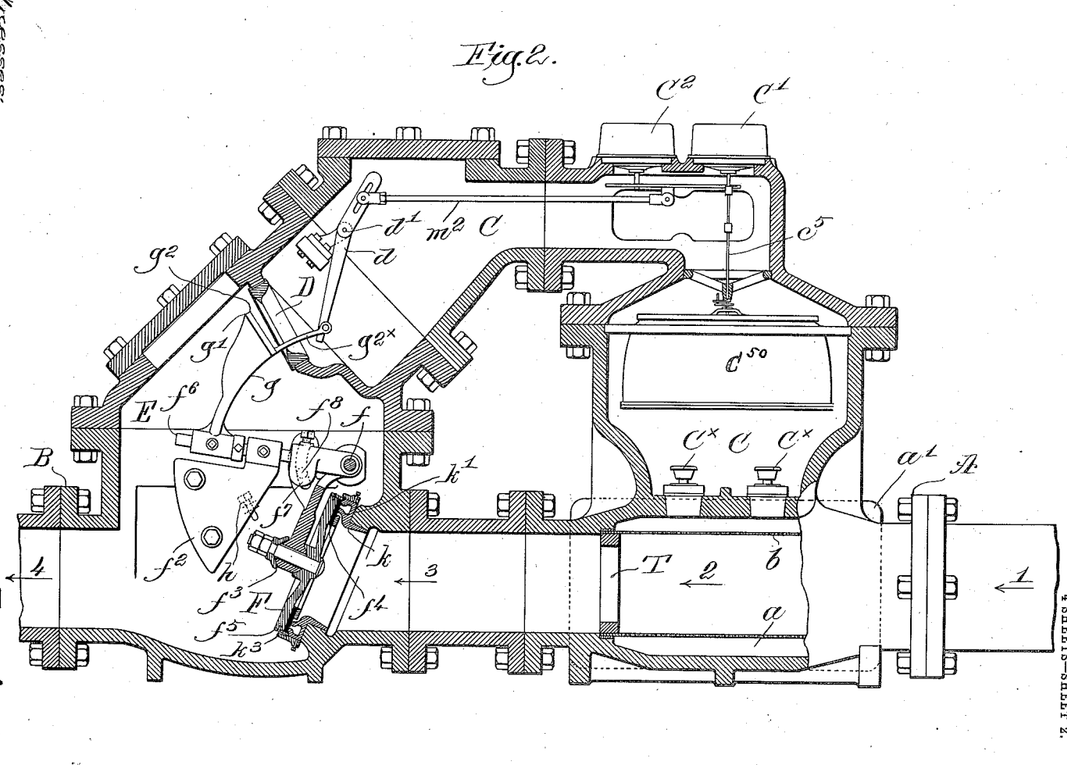
Fig. 2 represents a central, vertical, longitudinal cross-section of the device shown in Fig. 1.

It is necessary when the check-valve is well open or entirely open, that the flow through the by-pass should continue, but since the main pipe is comparatively straight and unobstructed while the by-pass is more or less sinuous and obstructed, with the meter mechanism and other parts, there is considerable friction loss in the by-pass which may result in causing most of the flow to pass through the main pipe. An adjustable friction ring, shown at T in Fig. 2, is inserted in the main pipe. This for convenience is placed near the eduction end of the chamber $a$, where it can be readily inserted and removed through the opening opposite the chamber $a$. The inside diameter of this friction ring may be varied as required by substituting different rings, and should not be any smaller than necessary to overcome the friction loss in the by-pass and insure the proper flow therethrough.

The construction of the proportional meter will be apparent from the foregoing description, as also its general operation. The operation of the main clapper valve and the conoidal valve will be more readily understood by reference to Figs. 3-8 inclusive of the drawings, which illustrate diagrammatically these two valves and their seats at different positions which the valves assume in use.

Figure 3:
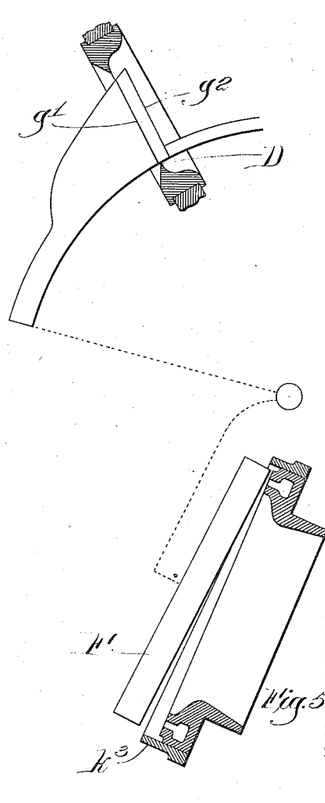
Figs. 3–8 inclusive are diagrammatic views of the main check-valve and the by-pass viewed in various positions.

Fig. 3 represents the main check-valve F closed upon its seat. In this position the conoidal valve *g* must be sufficiently far from the port D to allow for the maximum flow of water through the by-pass.

Figure 4:
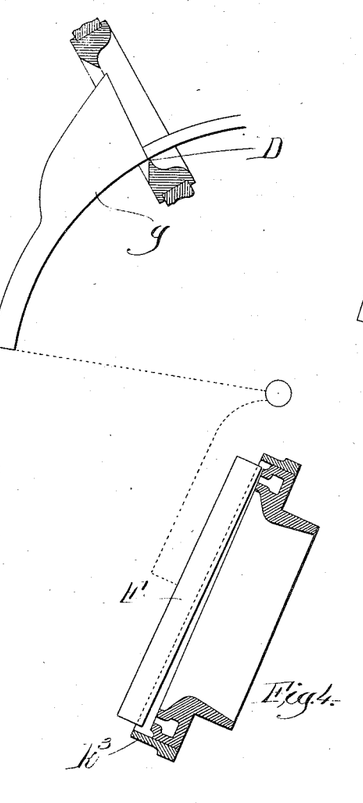

Fig. 4 represents the position which the two valves would take if the lip $k^3$ and the prolongation of the conoidal valve *g* were not employed. In such case the valve F would open to about the extent indicated sufficient to allow the minimum amount to pass through the check-valve. It would be necessary thereupon for the conoidal valve *g* to enter the seat D, but such a slight movement of the conoidal valve *g* would result in its being located at a correspondingly slight distance from the seat D in its closed position, which would retard the maximum flow through the by-pass. It is necessary, therefore, to give the conoidal valve *g* a more extended movement in order that when the check-valve is closed the conoidal valve may be at a considerable distance from the port D. This result is secured by the use of the lip $k^3$.

Fig. 5 represents the position which the check-valve F assumes immediately upon the opening thereof when the construction embodies the improvements of the present invention. Assume, for example, that the check-valve F is to open at a flow of 150 gallons per minute. The area requisite to pass this flow can be calculated. The area between the lip $k^3$ and the periphery of the check-valve F is then made considerably less, and, as will appear later, of an area sufficient to pass the flow of water at which the valve is desired to close. The consequence of making this area between the lip $k^3$ and the valve F less than the area required to pass the flow upon the opening of the check-valve F results upon the opening of the check-valve F at the minimum flow in forcing the check-valve F after the manner of a piston out through the lip $k^3$ to the position indicated in Fig. 5, or in other words, to a position where the area of flow between the edge of the valve F and the edge of the lip $k^3$ is the area required to pass the minimum flow. This gives a considerable movement to the check-valve F sufficient to move the conoidal valve *g* from the position shown in Fig. 3, up to the position shown in Fig. 5, where the area $g'$ is in the port D. This movement can be made so extensive that the prolongation $g^2$ of the conoidal valve has been added to provide for maintaining the proportion of the flow upon the closing of the check-valve from the opening flow down to the flow at which the valve closes.

Figure 6:
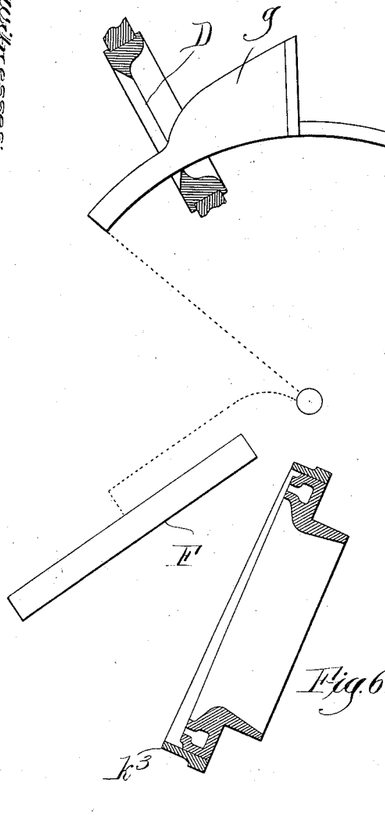

Fig. 6 represents the check-valve F and the conoidal valve *g* in their wide-open positions, the smallest cross-sectional area of the conoidal valve being at this time in the port D. Thereafter upon the diminishing of the flow through the main pipe the check-valve F and the conoidal valve *g* will return toward the position indicated in Fig. 3. As the flow diminishes the check-valve F will finally assume a position nearly in line with the top of the lip $k^3$, as indicated in Fig. 7, and at this time the area $g^2$ of the conoidal valve *g* will be at the port D. This is the time when the flow is passing at about which the check-valve F will close. As already explained, this flow is considerably less than the flow at which the check-valve opens, but by increasing the weight $f^2$ on the check-valve to the desired amount this flow can be made sufficiently large to insure the accurate operation of the indicating meter.

With the parts as shown in Fig. 7, it will be seen that the check-valve F will at once slide within the lip $k^3$ under the influence of the weight of the parts, to a position where the area required for the flow is equal to the area between the periphery of the valve F and the lip $k^3$, or to a position substantially as indicated in Fig. 8. But during this movement the conoidal valve *g* has passed out from the port D, allowing a comparatively large flow to pass out of the by-pass, and correspondingly reducing the flow through the main check-valve, thus allowing the check-valve F to close upon its seat.

It is obvious that the parts may be adjusted and arranged to act to open and close at varying flows within reasonable limits, and that various changes may be made in the construction, arrangement and operation of the parts without departing from the spirit of the invention.

Having described our invention, what we claim as new and desire to secure by Letters Patent, is:—

1. A proportional meter comprising a main, a by-pass around the check-valve, means for measuring the flow through the by-pass, and means including said check-valve, a valve for the by-pass, and connections between said valves to cause them to move coincidently to maintain the area of discharge at the check-valve substantially constant during the movement of the check-valve just prior to closing, and simultaneously to increase the discharge area of the by-pass, whereby the diversion of flow from the main to the by-pass allows of a quick closing movement of the check-valve.

2. A proportional meter comprising a main, a by-pass around the weighted check-valve, means for measuring the flow through the by-pass, and means including said weighted check-valve, a valve for the by-pass, and connections between said valves to cause them to move coincidently to maintain the area of discharge at the check-valve substantially constant during the movement of the check-valve just prior to closing, and simultaneously to increase the discharge area of the by-pass, whereby the diversion of flow from the main to the by-pass allows of a quick closing movement of the check-valve.

3. A proportional meter comprising a main, a check-valve therein, a by-pass around said check-valve, means for measuring the flow through the by-pass, a conoidal valve for the by-pass, connections between the said valves to cause them to move coincidently, means for maintaining the area of discharge at the check-valve practically constant during the initial opening movement of the check-valve, whereby a prolonged movement of the conoidal valve is allowed to bring it into position.

4. A proportional meter comprising a main, a check-valve therein, a by-pass around said check-valve, means for measuring the flow through the by-pass, a valve for the by-pass, connections between the said valves to cause them to move coincidently, means for maintaining the area of discharge at the check-valve practically constant during the initial opening and final closing movement thereof.

5. A proportional meter comprising a main, a check-valve therein, a by-pass around said check-valve, means for measuring the flow through the by-pass, a valve for the by-pass, connections between the said valves to cause them to move coincidently, a lip projecting slightly beyond the check-valve seat and concentric with the periphery of the check-valve to present between said lip and said periphery an area of discharge less than the area of discharge required at the opening of the check-valve, whereby the check-valve upon the opening thereof is forced beyond the edge of the lip.

6. A proportional meter comprising a main, a weighted check-valve therein, a by-pass around said check-valve, means for measuring the flow through the by-pass, a conoidal valve for the eduction port of the by-pass, connections between the said valves to cause them to move coincidently, a lip projecting slightly beyond the check-valve seat and concentric with the periphery of the check-valve to present between said lip and said periphery an area of discharge less than the area of discharge required at the opening of the check-valve, whereby the check-valve upon the opening thereof is forced beyond the edge of the lip.

7. A proportional meter comprising a main, a check-valve therein, a by-pass around said check-valve, means for measuring the flow through the by-pass, a valve for the by-pass, connections between the said valves to cause them to move coincidently, a valve-seat for the check-valve presenting an annular face in the direction of the path of the closing movement of the check-valve and presenting between itself and the check-valve during the closing movement of the check-valve a discharge area less than the discharge area requisite upon the opening of the check-valve, such movement causing the by-pass valve to take the position requisite to pass a flow of the desired proportion.

8. A proportional meter comprising a main, a weighted check-valve therein, a by-pass around said check-valve, means for measuring the flow through the by-pass, a conoidal valve for the by-pass, connections between the said valves to cause them to move coincidently, means for maintaining the area of discharge of the check-valve practically constant during its movement just prior to closing while the opening of the by-pass valve increases, whereby the increased flow in the by-pass becomes effective to close the check-valve.

9. A proportional meter comprising a main, a check-valve therein, a by-pass around said check-valve, means for measuring the flow through the by-pass, a valve for the by-pass, connections between the said valves to cause them to move coincidently, a differential seat for the check-valve, means for maintaining the area of discharge at the check-valve practically constant during the initial opening and final closing movement thereof.

10. A proportional meter comprising a main, a by-pass around the check-valve, means for measuring the flow through the by-pass, and means including said check-valve, a valve for the by-pass, and connections between said valves to cause them to move coincidently to maintain the area of discharge at the check-valve substantially constant during the movement of the check-valve just prior to closing, and simultaneously to increase the discharge area of the by-pass, whereby the diversion of flow from the main to the by-pass allows of a quick closing movement of the check-valve, and a differential seat for said check-valve comprising a chamber opening at the face of the valve seat and connected with the atmosphere.

11. A proportional meter comprising a main, a check-valve therein, a differential seat for said check-valve comprising a chamber opening at the face of the valve-seat and connected with the atmosphere, a by-pass around said check-valve, means for measuring the flow through the by-pass, a valve for the by-pass, connections between said valves to cause them to move coincidently.

12. A proportional meter comprising a main, a by-pass around the check-valve, means for measuring the flow through the by-pass, and means, including said check-valve, a valve for the by-pass, and connections between said valves to permit them to move in unison, operative during said movement to maintain the area of discharge at the check-valve substantially constant during the movement of the check-valve just prior to closing, and simultaneously to increase the discharge area of the by-pass, whereby the diversion of flow from the main to the by-pass allows of a quick closing movement of the check-valve.

13. A proportional meter comprising a main, a by-pass around the weighted check-valve, means for measuring the flow through the by-pass, and means, including said weighted check-valve, a valve for the by-pass, and connections between said valves to permit them to move in unison, operative during said movement to maintain the area of discharge at the check-valve substantially constant during the movement of the check-valve just prior to closing, and simultaneously to increase the discharge area of the by-pass, whereby the diversion of flow from the main to the by-pass allows of a quick closing movement of the check-valve.

14. A proportional meter comprising a main, a check-valve therein, a by-pass around said check-valve, means for measuring the flow through the by-pass, a conoidal valve for the by-pass, connections between the said valves to permit them to move in unison, means for maintaining the area of discharge at the check-valve practically constant during the initial opening movement of the check-valve, whereby a prolonged movement of the conoidal valve is allowed to bring the said valve into position.

15. A proportional meter comprising a main, a check-valve therein, a by-pass around said check-valve, means for measuring the flow through the by-pass, a valve for the by-pass, connections between the said valves to permit them to move in unison, means for maintaining the area of discharge at the check-valve practically constant during the initial opening and final closing movement thereof.

In testimony whereof, we have signed our names to this specification, in the presence of two subscribing witnesses.

EDWARD V. FRENCH.
GEORGE F. HILLER.

Witnesses:
NATHAN HEARD,
MABEL PARTELOW.